United States Patent [19]
Artigalas

[11] Patent Number: 5,181,102
[45] Date of Patent: Jan. 19, 1993

[54] TELEVISION CAMERA AND DISPLAY EMPLOYING QUINCUNCIAL SCANNING

[75] Inventor: Max Artigalas, Le Chesnay, France

[73] Assignee: Thomson Consumer Electronics, Courbevoie, France

[21] Appl. No.: 675,881

[22] PCT Filed: Aug. 17, 1990

[86] PCT No.: PCT/FR90/00617

§ 371 Date: Apr. 5, 1991

§ 102(e) Date: Apr. 5, 1991

[87] PCT Pub. No.: WO91/03125

PCT Pub. Date: Mar. 7, 1991

[30] Foreign Application Priority Data

Aug. 25, 1989 [FR] France .................. 89 11255

[51] Int. Cl.$^5$ .................. H04N 7/00
[52] U.S. Cl. .................. 358/56; 358/209
[58] Field of Search .................. 359/498; 358/55, 209, 358/217, 56, 64, 225, 213.11, 213.13, 213.19, 242, 250

[56] References Cited

U.S. PATENT DOCUMENTS

| | | | |
|---|---|---|---|
| 3,588,224 | 6/1971 | Pritchard | 359/498 |
| 4,587,553 | 5/1986 | Wantanabe et al. | 358/64 |
| 4,675,727 | 6/1987 | Sekizawa et al. | 358/55 X |
| 4,761,682 | 8/1988 | Asaida | 358/55 X |
| 4,807,981 | 2/1989 | Takizawa et al. | 359/498 |
| 4,988,171 | 1/1991 | Yokota | 359/498 |

FOREIGN PATENT DOCUMENTS

| | | |
|---|---|---|
| 59-279 | 1/1984 | Japan. |
| 61-107882 | 5/1986 | Japan. |
| 62-257291 | 11/1987 | Japan. |
| WO88/01462 | 2/1988 | PCT Int'l Appl. . |

OTHER PUBLICATIONS

IEEE Transactions on Consumer Electronics vol. 34, No. 3; Nishida et al. "Wide Dynamic range HDTV Image Sensor With Aliasing Suppression", Aug. 1988.
FKT Fernsen-Und Kino-Technik, vol. 42, No. 10, Oct. 1988 Silverberg: "HQTV-Systeme-Ein Vergleich

*Primary Examiner*—James J. Groody
*Assistant Examiner*—Mark R. Powell
*Attorney, Agent, or Firm*—Roland Plottel

[57] ABSTRACT

A television camera and display device, in which a transmission and reception utilizes quincuncial scanning (HDQ) with sub-sampling associated with an optical filter (9) for reducing the diagonal resolution of the image. The filter (9) prevents the folding of the spectrum when subsampling is employed, and permits the simplification of the device. The device may be implemented in both solid-state and vacuum tube form. It is applicable especially to high-definition television having only a restricted pass band and low sampling frequencies, and to the acquisition of and to the visual display of images in HDQ mode.

16 Claims, 4 Drawing Sheets

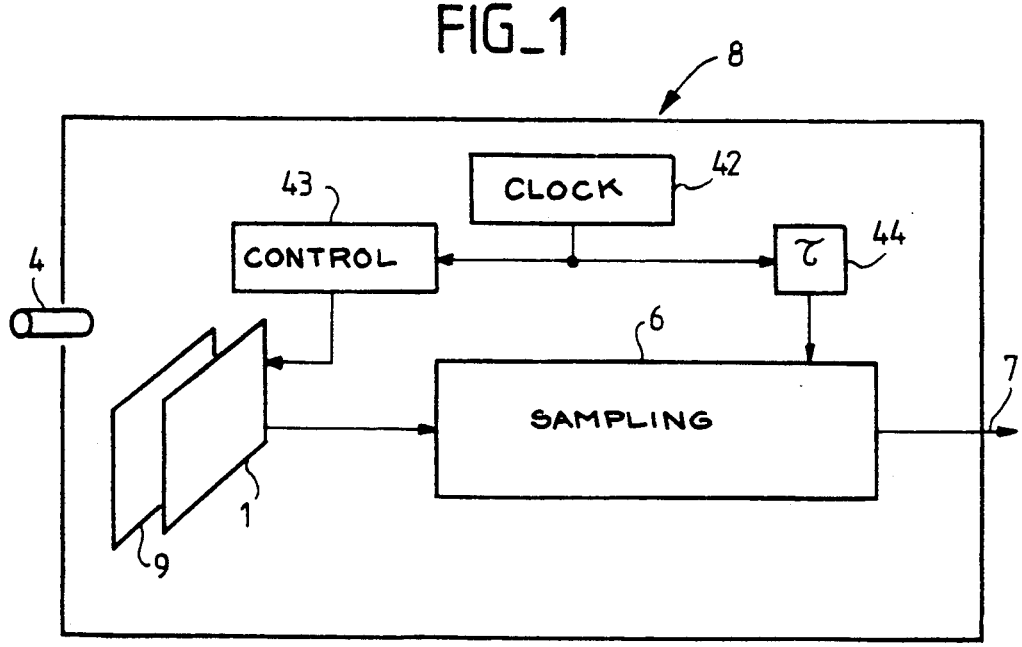
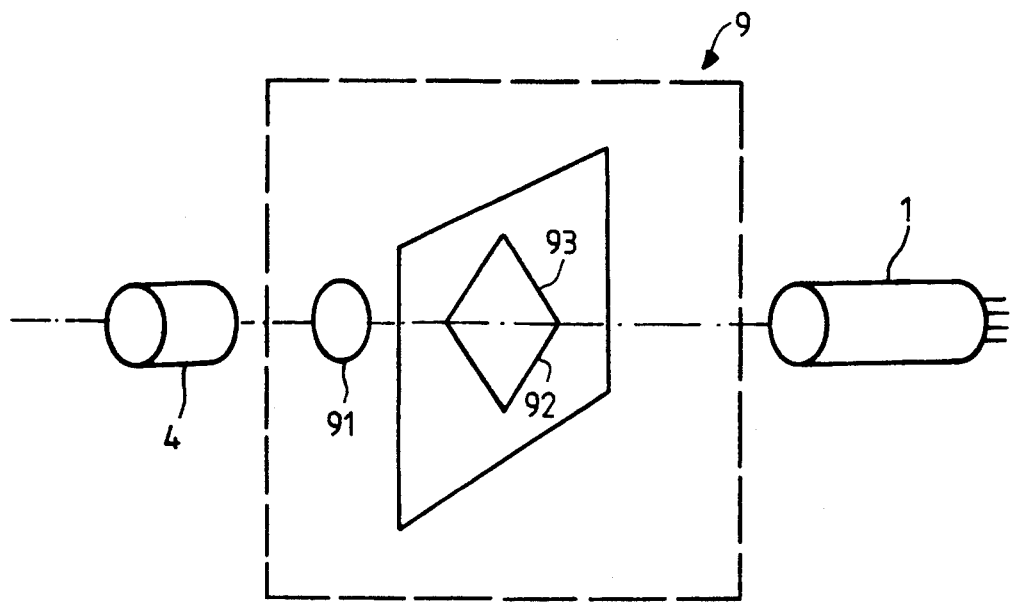

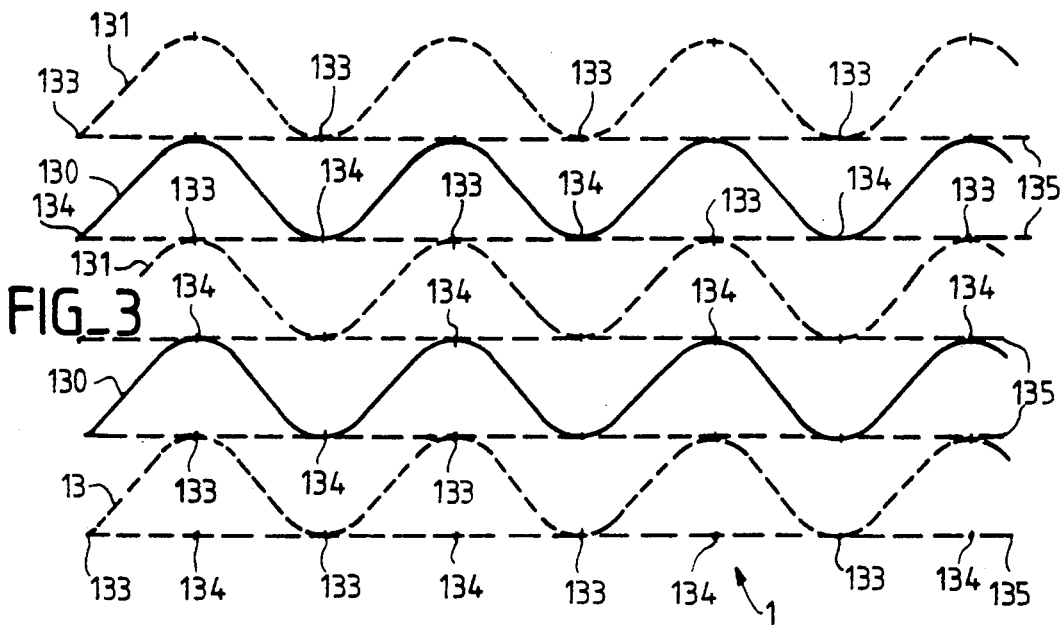
FIG_3
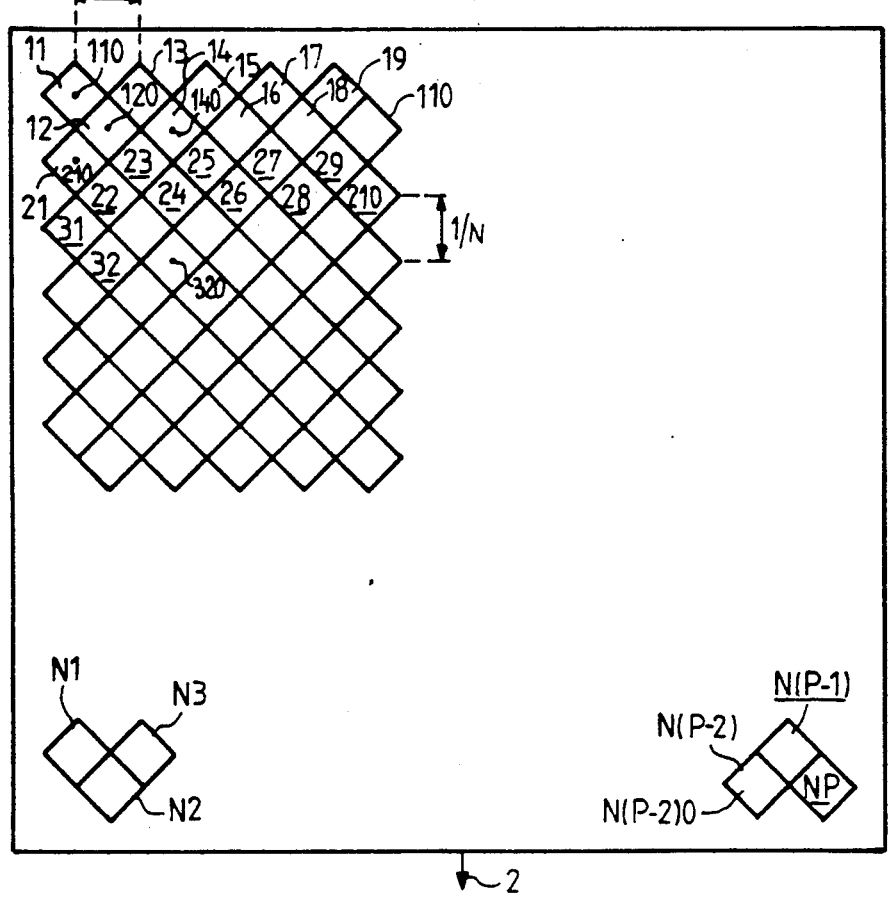
FIG_4

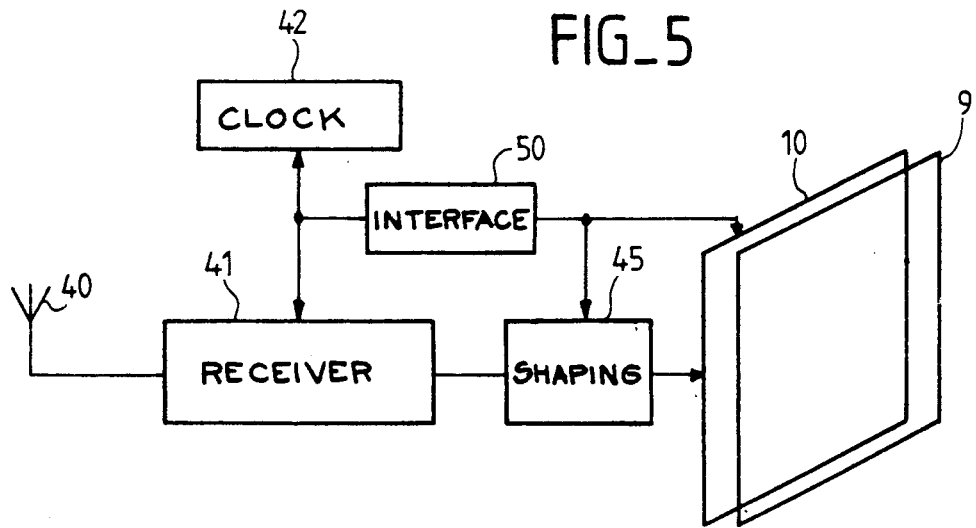
FIG_5
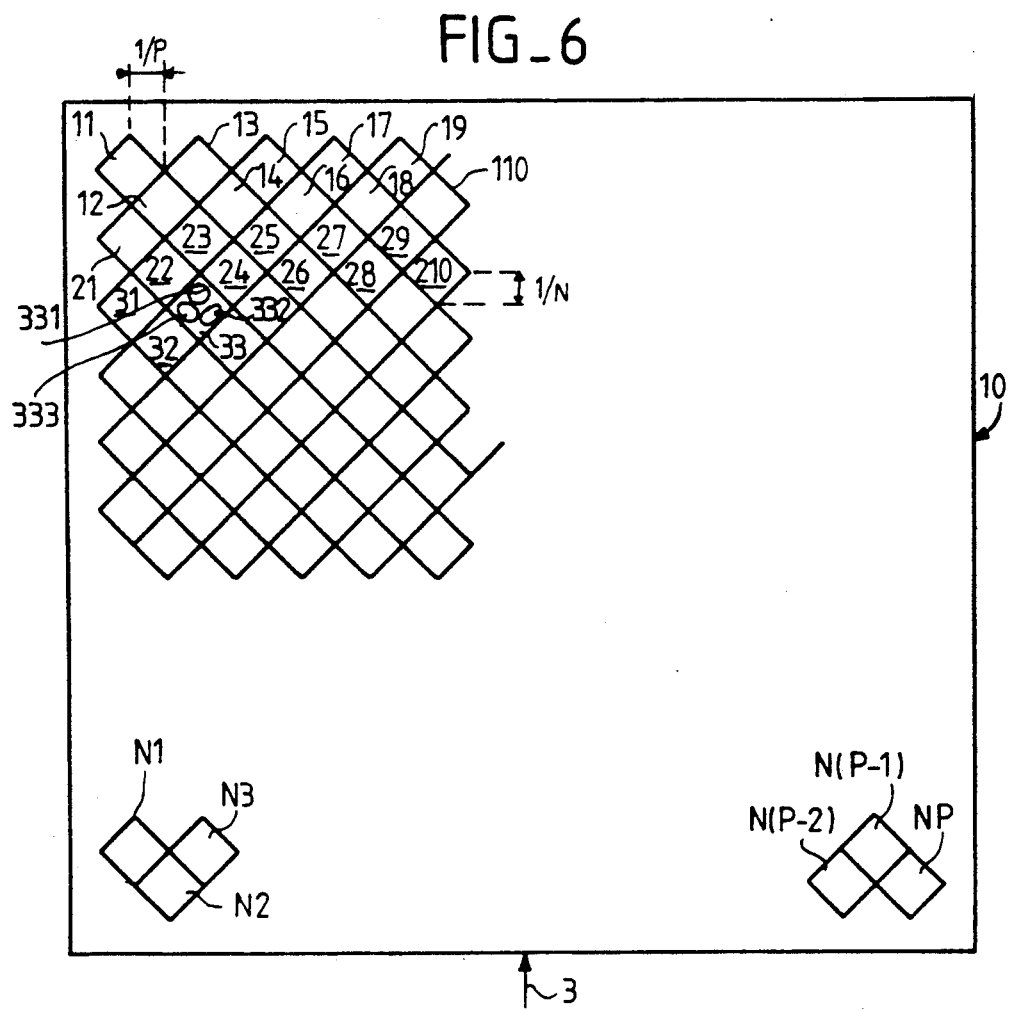
FIG_6

FIG_7
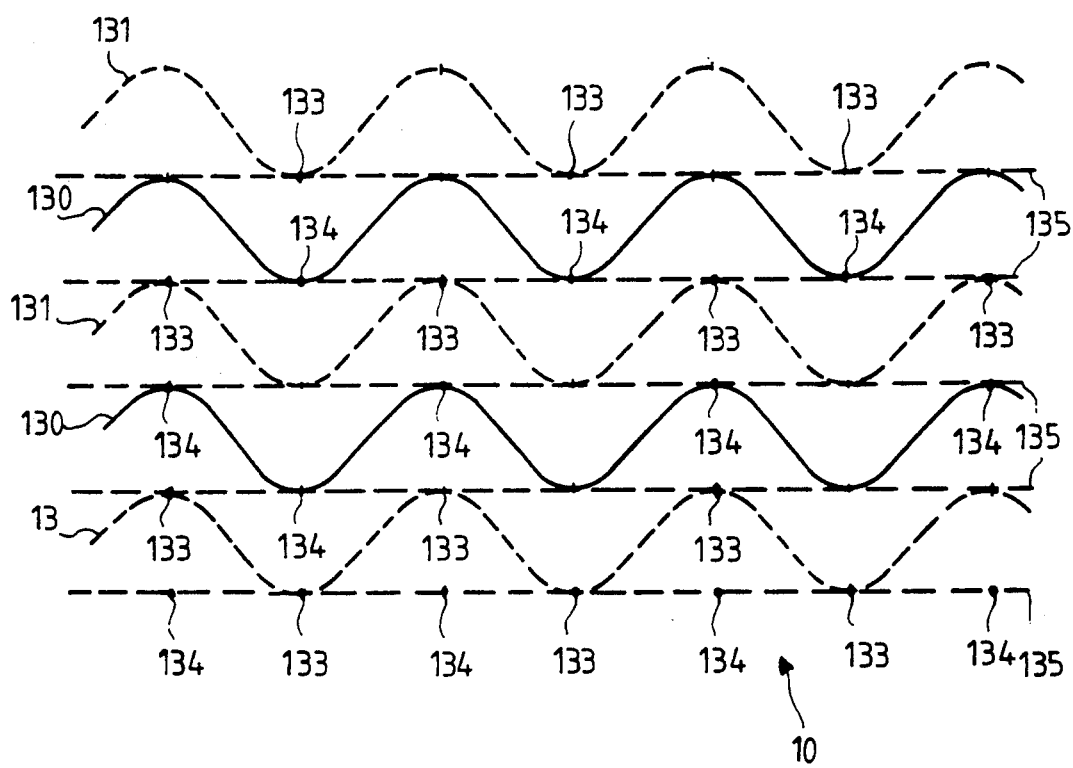
FIG_8
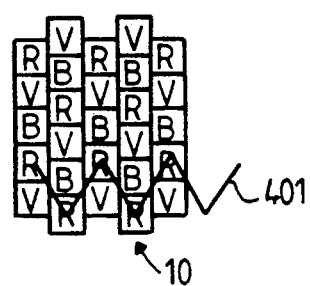

TELEVISION CAMERA AND DISPLAY EMPLOYING QUINCUNCIAL SCANNING

BACKGROUND OF THE INVENTION

The invention relates principally to a camera and to a visual display device.

For high-definition television, an HDQ model has been proposed for a quincuncial sequential mode. Such a mode is used both when taking pictures and upon display on cathode-ray tubes. Furthermore, all the devices operated at very high sampling frequency, for example 144 MHz; and this makes their construction difficult and their prime cost high.

In "Digest of Technical Papers" of International Conference on Consumer Electronics, June 1988, Chicago, page 60 in the article "Wide Dynamic HDTV Image Sensor with Alias Suppression", there is proposed a charge transfer sensor having a vertical quincuncial structure. The quincuncial structure relates only to the photosensitive cells and not to the spatial distribution actually sampled at the output. At each clock cycle, the signals from four elemental cells are summated to form a signal corresponding to that of a cell of larger size permitting the suppression of defects of the image.

The use of optical filters placed in front of charge transfer sensors (CCD in English-language terminology) has been proposed for the purpose of eliminating the high spatial frequencies producing folding of the spectrum beyond the half-frequency corresponding to the pitch of the sensor.

An object of the invention is digital television associating quincuncial scanning and subsampling. In order to avoid any folding of the spectrum due to the subsampling, the optical filtering of the signal is carried out. The optical filter reduces the resolution. Advantageously, the reduction of the resolution is carried out diagonally. In fact, the diminution of the resolution along the diagonals of the image causes little trouble, since it is difficult for humans to perceive this.

A further object of the invention is to provide devices for taking pictures and for visual display which are specially suitable for this type of quincuncial scanning.

SUMMARY OF THE INVENTION

According to an aspect of the invention there is a digital device for acquisition or for display of television images, having a plurality of quincuncial lines operating in subsampling mode, with an optical filter for reducing the diagonal resolution.

The display may be a television, with a cathode-ray tube, or a flat liquid crystal screen.

The device for taking pictures is a television camera, with a vacuum tube, sensor or a CCD charge transfer sensor.

The optical filter may have birefringent optical plates which are parallel to one another, and optical means forming the Fourier transform of the image, and a diaphragm eliminating high diagonal spatial frequencies from the spectrum.

A further aspect of the invention is a charge transfer device (CCD) with a plurality of photosensitive cells and shift registers, in which the successive cells and their associated registers are disposed in quincunx.

A further aspect of the invention is a display device with a plurality of display cells, in which the successive cells are disposed in quincunx. The cells have the shape of a characterised in that the cells have the shape of a lozenge, one half of the width of which is proportional to 1/P, P being the number of points in one line of an image obtained by said device. Alternatively, the cells have the shape of a lozenge, one half of the height of which is proportional to 1/N, N being the number of useful lines of an image obtained by said device.

The device has the capacity to provide a visual display of colours; and it may be liquid crystals (LCD) or plasma panel, or Cathode-ray tube (CRT).

Each cell 1, 1 to N, P has a plurality of elements (R, G, B) which are capable of displaying different colours, the elements of each colour being disposed in quincunx. The elements (R, G, B) are disposed in columns with a cyclic distribution of the colours, the successive columns being offset by 0.5 times the pitch of the triplet (R, G, or B) of colours.

The invention will be better understood by means of the description hereinbelow and the accompanying figures which are given as non-limiting examples, in which:

BRIEF DESCRIPTION OF THE DRAWINGS

FIG. 1 is a diagram of a television camera according to the present invention;

FIG. 2 is a diagram illustrating an embodiment of the optical filter;

FIG. 3 is a diagram of a tube specially suitable for carrying out the quincuncial scanning;

FIG. 4 is a diagram of a sensor, for example of frame transfer type, which is particularly suitable for the cameras according to the present invention;

FIG. 5 is a diagram of a television receiver according to the present invention;

FIG. 6 is a diagram of a display device, for example of liquid-crystal type, according to the present invention;

FIG. 7 is a diagram of a cathode-ray tube display device according to the present invention;

FIG. 8 is a diagram of an embodiment of colour display device according to the present invention.

In FIGS. 1 to 8, the same references have been used to designate the same elements.

DESCRIPTION OF THE PREFERRED EMBODIMENTS

FIG. 1 shows an embodiment of a video camera according to the present invention. The camera 8 has an objective lens 4, an optical filter 9, an image sensor 1, a sampling device 6, a clock 42, a control device 43, a delay device 44 and a video signal output 7.

The objective lens 4 forms an image on the image sensor 1. The image formation is carried out via optical filter 9. The purpose of the optical filter 9 is to reduce the transmission of the signals of high diagonal spatial frequencies. The video output of the sensor 1 is connected to the input of the sampling device 6. The clock 42 is connected, input of the control device 43 of the sensor 1, and on to an input of the delay device 44. The control device is a device of known type suitable for the type (vacuum tube, CCD or matrix sensor) and for the configuration of the sensor. The delay device 44 is, for example, a delay line. The control device 43 supplies the control and synchronisation signals which are required by the sensor 1. The delay device 44 compensates the paths of the signal via the control device 43, and the sensor 1, as far as the sampling device 6. The sampling device 6 carries out a sampling of the video signal and supplies a digitised video signal at the output 7.

Advantageously, the sampling frequency is divided, for example, by two in the device 6. For example, a sampling of the luminance Y is carried out at a frequency of 72 MHz instead of 144 MHz and a sampling of the chrominance at 36 MHz instead of 72 MHz. A subsampling does not cause any spectrum folding described by Shanon's theorem, since the diagonal spatial frequencies have been filtered out by the optical filter 9. Such a subsampling permits operation at lower frequencies and thus a reduction of the cost of the equipment.

The filter 9 induces a diminution of the diagonal resolution of the image. This loss of resolution is not very troublesome to the extent that the eye is not very sensitive to the diagonal resolution of the image. The filter 9 eliminating the high diagonal spatial frequencies is, for example, a birefringent quartz filter with a plurality of quartz plates with the orientation of the crystal mesh offset by 90°. It is possible, for example, to use the filter of known type, the vertical axis of which has been turned through 45°.

In a modified embodiment illustrated in FIG. 2, the filtering is carried out after a Fourier transformation with respect to the spectrum of spatial frequencies. To do this, use is made, for example, of a lens 91 which provides the Fourier transform of the image, and the filtering is carried out by placing a diaphragm 92 exhibiting an aperture 93, for example in the form of a lozenge or a rectangle, the diagonals of which are vertical and horizontal. The size of the aperture 93 of the diaphragm 92 determines the spatial frequencies eliminated.

The possibility of optically obtaining the Fourier transform of an image is well known. It is employed, especially, in phase contrast microscopy.

A camera 8 comprising a filter 9 placed in front of the objective lens 4 does not depart from the scope of the present invention.

FIG. 3 shows the face of a vacuum tube image sensor 1 permitting a quincuncial scanning. In the case of an analysis tube, the target is scanned line 130 by line 130 by causing the spot to oscillate vertically. Typically, the frequency of oscillation is equal to one half of the scanning frequency, for example 72 MHz, and the peak amplitude is equal to V/N, V being the vertical scanning amplitude, for example 7.85 mm and N the number of lines, for example 1152 useful lines in the proposed HDP European standard. These vertical oscillations are advantageously obtained by using the deflection circuits of the tube 1, to which there are applied periodic signals of, for example, 36 MHz.

The sampling of the signal is carried out in the course of passing through the end points 134 of the lines 130. It is seen in FIG. 3 that there are points 133 belonging to lines 135 corresponding to an orthogonal progressive scanning which are not sampled with the device according to the present invention.

The reference 131 has been used to designate the lines delimiting the space scanned on the target of the camera according to the present invention. It is seen that the vertical distance between two successive limits 131 is twice that between two lines 135 corresponding to a camera of known type. Thus, the camera according to the present invention includes one photosensitive surface per sample of the signal, which surface is twice that of the camera of the known type (HDP). Consequently, the camera according to the present invention offers a sensitivity which is twice as great as the sensitivity of the cameras of known type (HDP) and a sensitivity equal to that of conventional interlaced type.

FIG. 4 shows an embodiment of charge transfer image sensors according to the present invention. These sensors include N lines of P image elements. A line is understood as referring to a widthwise arrangement forming a sinusoid, the arches of which correspond to P cells.

The charge transfers are carried out in line quincunx, that is to say cell 1,1, cell 1,2, cell 1,3, cell 1,4, cell 1,5, cell 1,6 . . . , as far as the cell 1,P at the end of the line,
cell 2,1, cell 2,2, . . . , as far as 2,P at the end of the line;
. . . ;
as far as the last line N,1, N,2, N,3, . . . , N, (P-2), N, (P-1), N,P.

Advantageously, each cell 1,1 to N,P has a lozenge or square shape comprising a vertical diagonal and a horizontal diagonal. Thus, it is possible to construct cells exploiting the maximum surface of the sensor and to increase the size of each cell. This facilitates the construction of the sensor, and its sensitivity is improved.

Advantageously, the width of each cell is proportional to 2/P, P being the number of cells in one line, for example 1920 points according to a proposed European standard.

Advantageously, the height of a cell is proportional to 2/N, N being the number of lines of the sensor of orthogonal structure. Nevertheless, these are the maximum dimensions of the cells and these may have to be reduced, for example, in order to make connections. In this case, it is important that the centres (for example 110, 120, 140, 210) of the cells should respect the vertical spacings of 2/N and horizontal spacings of 2/P with a quincuncial structure.

The image sensor 1 has an output 2 providing a video signal.

It is fully understood that other types of sensors such as, for example, matrix-structure sensors, do not depart from the scope of the present invention, to the extent that they adopt the line quincunx structure.

Likewise, the use of colour sensor does not depart from the scope of the present invention.

FIG. 5 shows a television receiver according to the present invention. The receiver comprises a signal source, for example an antenna 40, or a video recorder, a receiving device 41 (tuner in English-language terminology), a clock 42, an interface 50, a visual display device 10, a filter 9 and a shaping device 45.

The output of the antenna 40 is connected to an input of the receiver 41. The clock 42 is connected to an input of the receiver 41 and of the interface 50. An output of the receiver 41 is connected to a first input of the shaping device 45. An output of the interface 50 is connected to a synchronisation input of the visual display device 10 and to a second input of the shaping device 45. The filter 9 is placed in front of the visual display device 10.

Receiver 41 is a receiver of the known type, for example an HDQ-type receiver. This type of receiver provides images with a sampling frequency which is half that of the HDP orthogonal high-definition devices. These images, which are shaped by the device 45, are displayed by visual display device 10 which has a cathode-ray tube or a device as illustrated in FIG. 6. In the case of a cathode-ray tube, the spot is caused to oscillate in a manner similar to that illustrated in FIG. 3. A filter 9 similar to the filter 9 of FIG. 3 permits the elimination of the high diagonal spatial frequencies and the avoidance of the aberrations of the image which are caused by the sub-sampling.

It is recalled, at this point, that in the HDP orthogonal high-definition device the image field is sampled on the basis of 1920 points which are aligned in rectilinear columns and according to 1152 rectilinear lines in terms of width. The system thus comprises a grid of orthogonal strokes, each line-column intersection defining a sampling point. This grid represents the tightest sampling. With the invention, which provides a quincuncial arrangement, there is omission of sampling certain diagonal alignments of the HDP reference grid.

The device according to the present invention is, of course, applicable to back projection. For example, back projectors comprising a liquid-crystal device will be equipped with a filter 9 placed in proximity to this device. The back projector comprising three visual display devices 10 will have, for example, a device for the superposition of images and also a single filter.

FIG. 6 shows an embodiment of visual display device which is particularly well suited to the device according to the present invention. The visual display device illustrated in FIG. 6 is, for example, a black-and-white liquid-crystal device. It is entirely understood that the use of visual display devices of monochrome or colour plasma panel type or of colour liquidcrystal type comprising three display cells per image element do not depart from the scope of the present invention. Thus, in the cells 3,3 one possible arrangement has been followed of elements 331, 332 and 333 of primary colours, typically red, blue or green.

The display of the successive image elements is carried out in line quincunx, that is to say cell 1,1, cell 1,2, cell 1,3, cell 1,4, cell 1,5, cell 1,6, . . . , as far as the cell 1P at the end of the line, cell 2,1, cell 2,2, . . . , as far as 2,P at the end of the line;

. . . ;

as far as the last line N,1, N,2, N,3, . . . , N (P-2), N, (P-1), N,P.

Advantageously, each cell 1,1 to N,P has a lozenge or square shape comprising a vertical diagonal and a horizontal diagonal. Thus, it is possible to construct cells exploiting the maximum surface of the sensor and to increase the size of each cell. This facilitates the construction of the display system, and its contrast is improved.

Advantageously, the width of each cell is proportional to 2/P, P being the number of cells in a line according to the HDP standard, i.e. 1920 points.

Advantageously, the height of a cell is proportional to 2/N, N being the number of lines of the display system according to the HDP standard, i.e. 1152 lines.

The visual display device 10 has an input 3 for the video signal.

FIG. 8 shows an example of distribution of elements R, G and B of colours red, green and blue respectively of a display device 10. This corresponds both to the luminophores of a cathode-ray tube and to the cells of a liquid-crystal or plasma device.

In the example illustrated in FIGS. 8, the screen 10 is divided into columns. Each column comprises a cyclic distribution of the elements R, G and B. Each column is offset by 0.5 times the pitch of the triplet in relation to the preceding line and to the following line. Thus, elements of identical colours reappear at the same height every two columns.

The display is carried out in line quincunx for each colour.

In the figure, an example of a red line bears the reference 401.

It is entirely understood that only a few elements are represented in FIG. 8. An actual visual display device comprises a far greater number of elements R, G and B.

In order that the display device should not introduce any deformation of the image, it is necessary for the pitch of the image elements to be less than or equal to the pitch of the scanning, that is to say the distance between two successive points 134 of FIG. 7.

The present invention is applicable to television, and especially high-definition television using only a restricted pass band and using low sampling frequencies.

The present invention is applicable in particular to the acquisition and to the visual display of the image in HDQ mode.

I claim:

1. A high definition television receiver device comprising a visual display having a plurality of quincumcially disposed display cells, a high definition video signal source (40), circuitry (41, 42, 45 and 50) connected between said source and display for generating a signal with a plurality of quincuncial lines (N) and operating in a subsampling mode, an optical filter between said display and viewer for correcting diagonal resolution.

2. Device according to claim 1, characterized in that said display comprises a screen (10) comprising a cathode-ray tube.

3. Device according to claim 1, characterized in that said display comprises a flat liquid-crystal screen (10).

4. Device according to either of claims 2 and 3, characterised in that the screen (10) comprises a plurality of display cells, the successive cells (1,1; 1,2; 1,3; 1,4; 1,5; 1,6; 1,7; 1,7; 1,9; . . . ; 2,1; 2,2; 2,3; . . . ; N,A; N,2; N,3; . . . N, (P-2); N, (P-1); N,P) being disposed in quincunx.

5. Device according to claim 4, characterized in that said visual display includes means for displaying colors, and is selected from the group consisting of liquid crystals, plasma panel, and cathode ray tube.

6. Device according top claim 5, characterized by the fact that each cell (1,1 to N,P) comprises a plurality of elements (R, G, B) which are capable of displaying different colours, the elements of each colour being disposed in quincunx.

7. Device according to claim 6, characterized in that said elements (R, G, B) are disposed in columns comprising a cyclic distribution of the colours, the successive columns being offset by 0.5 times the pitch of the triplet of colours (R, G or B).

8. A high definition television camera device comprising a lens (4) for focusing on an object, an image sensor (1) for receiving an image from said lens, HDP type circuitry (6, 42, 43, 44) connected to said sensor for scanning said sensor in a plurality of quincuncial lines (N) operating in a subsampling mode and for generating a digital video output signal of said image on said sensor and an optical filter (9) between said lens and sensor for reducing diagonal resolution of said image on said screen and for avoiding any folding of the spectrum of said digital output signal due to subsampling by said circuitry.

9. Device according to claim 8 or 1, characterized in that said filter comprises optical means (91) for forming the Fourier transform of the image and a diaphragm (92) eliminating high diagonal spatial frequencies from the spectrum.

10. Device according to claim 8 or 1, characterized in that the optical filter (9) comprises birefringent optical plates which are parallel to one another.

11. Device according to claim 8, characterized in that said sensor (1) comprise a charge transfer device (CCD).

12. Device according to claim 11, characterised in that the charge transfer device (1) comprises a plurality of photosensitive cells and shift registers, the successive cells (1,1; 1,2; 1,3; 1,4; 1,5; 1,6; 1,7; 1,8; 1,9; . . . ; 2,1; 2,2; 2,3; . . . ; N,1; N,2; N,3; . . . N, (P-2); N (P-1); N,P) and their associated registers being disposed in quincunx.

13. Device according to claim 12 or 1 characterised in that the cells (1,1; . . . ; N,P) have the shape of a lozenge, one half of the height of which is proportional to 1/N, N being the number of useful lines of an image obtained with said device.

14. Device according to claim 10 or 1, characterised in that the cells (1,1; . . . ; N,P) have the shape of a lozenge, one half of the width of which is proportional to 1/P, P being the number of points in one line of an image obtained with said device.

15. Device according to claim 14, characterized in that the cells (1, 1; . . . ; N,P) having the shape of a lozenge, one-half of the height of which is proportional to 1/N and being the number of useful lines of an image obtained with said device.

16. Device according to claim 8, characterized in that it comprises a sensor (1) comprising a vacuum tube.

* * * * *